(12) United States Patent
Tsuji

(10) Patent No.: US 10,731,608 B2
(45) Date of Patent: Aug. 4, 2020

(54) EXHAUST HEAT RECOVERY DEVICE

(71) Applicant: FUTABA INDUSTRIAL CO., LTD., Okazaki-shi, Aichi (JP)

(72) Inventor: Yoshiki Tsuji, Okazaki (JP)

(73) Assignee: FUTABA INDUSTRIAL CO., LTD., Okazaki-Shi, Aichi (JP)

(*) Notice: Subject to any disclaimer, the term of this patent is extended or adjusted under 35 U.S.C. 154(b) by 16 days.

(21) Appl. No.: 16/241,359

(22) Filed: Jan. 7, 2019

(65) Prior Publication Data

US 2019/0234276 A1 Aug. 1, 2019

(30) Foreign Application Priority Data

Jan. 26, 2018 (JP) .................................. 2018-011565

(51) Int. Cl.
| | |
|---|---|
| *F02M 26/32* | (2016.01) |
| *F02G 5/02* | (2006.01) |
| *F02M 26/28* | (2016.01) |
| *F02M 26/25* | (2016.01) |
| *F02M 26/29* | (2016.01) |
| *F01N 3/02* | (2006.01) |
| *F01N 5/02* | (2006.01) |

(52) U.S. Cl.
CPC ........... *F02M 26/32* (2016.02); *F01N 3/0205* (2013.01); *F01N 5/02* (2013.01); *F02G 5/02* (2013.01); *F02M 26/25* (2016.02); *F02M 26/28* (2016.02); *F02M 26/29* (2016.02); *F01N 2260/06* (2013.01); *F01N 2340/00* (2013.01)

(58) Field of Classification Search
CPC ........ F02M 26/32; F02M 26/25; F02M 26/28; F02M 26/29; F01N 5/02; F01N 3/0205; F01N 2260/06; F01N 2340/00; F01G 5/02

USPC .................................................... 123/568.12
See application file for complete search history.

(56) References Cited

U.S. PATENT DOCUMENTS

| | | | | |
|---|---|---|---|---|
| 8,793,986 B2* | 8/2014 | Caine | ..................... | B60H 1/025 60/320 |
| 10,100,787 B2* | 10/2018 | Jin | ...................... | F28D 21/0003 |
| 2009/0038302 A1* | 2/2009 | Yamada | ................ | F01N 3/0205 60/320 |
| 2010/0251702 A1* | 10/2010 | Shikazono | ................ | F01N 5/02 60/320 |
| 2018/0266367 A1 | 9/2018 | Shirai et al. | | |

(Continued)

FOREIGN PATENT DOCUMENTS

| | | | | |
|---|---|---|---|---|
| EP | 2693011 A1 * | 2/2014 | ............. | F01N 3/043 |
| EP | 2942500 A1 * | 11/2015 | ............. | F02D 9/101 |

(Continued)

*Primary Examiner* — Mahmoud Gimie
(74) *Attorney, Agent, or Firm* — Withrow & Terranova, P.L.L.C.; Vincent K. Gustafson

(57) ABSTRACT

A heat exchanger disposed in an exhaust heat recovery device exchanges heat between exhaust and cooling fluid. An inner shell of the heat exchanger externally surrounds an exhaust pipe and forms a heat exchange space between the inner shell and the exhaust pipe to accommodate arranged plates. An outer shell of the heat exchanger includes an EGR opening that leads the exhaust to an inlet system of an internal combustion engine. The outer shell forms an external space leading to the EGR opening between the outer shell and the inner shell. The inner shell includes at least one aperture area that communicates the heat exchange space with the external space.

15 Claims, 5 Drawing Sheets

(56) References Cited

U.S. PATENT DOCUMENTS

2018/0266369 A1    9/2018  Ishikawa et al.
2018/0274495 A1*   9/2018  Ishikawa .................. F01N 5/02

FOREIGN PATENT DOCUMENTS

| JP | 5477484    B2 | 4/2014 |
| JP | 2017126082 A1 | 7/2017 |
| JP | 2017126118 A1 | 3/2018 |

* cited by examiner

EXHAUST HEAT RECOVERY DEVICE

CROSS-REFERENCE TO RELATED APPLICATIONS

This application claims the benefit of Japanese Patent Application No. 2018-011565 filed on Jan. 26, 2018 in the Japan Patent Office, the entire disclosure of which is incorporated by reference herein.

BACKGROUND

The present disclosure relates to an exhaust heat recovery device.

A device having both a function to recover heat from exhaust from an internal combustion engine and a function to cool the exhaust for recirculation in an EGR is known. The EGR stands for Exhaust Gas Recirculator, and is a device that recirculates a part of exhaust to an inlet system of an internal combustion engine.

International Patent Application Publication No. 2017/126082 (WO2017/126082) discloses an exhaust heat recovery device. The disclosed device cools exhaust discharged from an exhaust pipe and then discharge the cooled exhaust to a recirculation path, which leads to an inlet system of an internal combustion engine. The disclosed exhaust heat recovery device includes a heat exchanger that cools the exhaust, and a shell. The heat exchanger includes circular plates arranged to externally surround the exhaust pipe. The shell externally surrounds the plates and includes an opening that leads to the recirculation path. Each of the plates includes an internal path for cooling fluid. The exhaust flows downstream around each plate to cause heat exchange between the exhaust and the cooling fluid. The exhaust cooled in the heat exchanger passes the opening of the shell and enters the recirculation path.

SUMMARY

However, according to the disclosure of WO2017/126082, pressure loss generated in the heat exchanger when the exhaust flows downstream around the plates increases in areas far from the opening to the recirculation path compared with that in areas near the opening. Pressure loss is, in other words, resistance on fluid flowing downstream. Due to this difference in pressure loss, exhaust flow is biased inside the heat exchanger, which reduces efficiency of the heat exchange.

Desirably, exhaust that is going to be recirculated to an inlet system of an internal combustion engine is efficiently cooled.

One aspect of the present disclosure is an exhaust heat recovery device disposed in an exhaust path from an internal combustion engine. The exhaust heat recovery device comprises an exhaust pipe, and a heat exchanger. The exhaust pipe carries exhaust downstream. The heat exchanger exchanges heat between the exhaust entered from the exhaust pipe and cooling fluid. The heat exchanger also comprises plates, an inner shell, and an outer shell. Each plate is circular in shape and includes a flow path for the cooling fluid inside. The plates externally surround the exhaust pipe and the plates are arranged along an axis that extends linearly. The inner shell externally surrounds the exhaust pipe such that a heat exchange space that accommodates the arranged plates is formed between the inner shell and the exhaust pipe. The outer shell includes an EGR opening coupled to an EGR pipe. The EGR pipe is configured to recirculate the exhaust to an inlet system of the internal combustion engine. The outer shell externally covers at least a part of the inner shell to form an external space, leading to the EGR opening, between the outer shell and the inner shell.

A direction that points from the EGR opening to the exhaust pipe and is orthogonal to the axis is a reference direction. A plane that lies orthogonally to the reference direction and passes a center of the heat exchange space in the reference direction is a first reference plane. The heat exchange space comprises a first volume and a second volume. The first volume is located between the first reference plane and the EGR opening; and the second volume is a remainder of the heat exchange space. The inner shell comprises at least one aperture area communicating the heat exchange space with the external space. In the at least one aperture area, an area of portion communicating the second volume with the external space is larger than an area of a portion communicating the first volume with the external space.

According to the aforementioned configuration, in the at least one aperture area, a total area of portions communicating the second volume with the external space (hereinafter referred to as the second aperture) is larger than a total area of portions communicating the first volume with the external space (hereinafter referred to as the first aperture). This prompts a pressure loss generated when the exhaust passes the second aperture to be less than a pressure loss generated when the exhaust passes the first aperture. A difference between a pressure loss generated until the exhaust reaches the EGR opening from the second volume and a pressure loss generated until the exhaust reaches the EGR opening from the first volume is therefore reduced.

Consequently, discharge of the exhaust from the second volume to the external space is prompted, which leads to a reduction of a bias in the exhaust flow in the heat exchange space. This can help efficiently cool the exhaust that is recirculated from the EGR opening to the inlet system of the internal combustion engine.

In one aspect of the present disclosure, the inner shell may comprise aperture areas. An average distance that the exhaust travels downstream in the external space from each aperture area to the EGR opening may be a travel distance. In each aperture area, area of a portion communicating the heat exchange space with the external space may increase as the travel distance increases.

As the travel distance at each aperture area increases, the pressure loss generated until the exhaust that passed each aperture area reaches the EGR opening increases. According to the aforementioned configuration, however, the area of the portion communicating the heat exchange space with the external space in each aperture area increases as the travel distance increases. Accordingly, the pressure loss generated when the exhaust passes each aperture area is prompted to decrease as the travel distance at each aperture area increases. Consequently, discharge of the exhaust from an aperture area having a long travel distance to the external space is prompted, which leads to a further reduction of the bias in the exhaust flow in the heat exchange space. The exhaust that is recirculated from the EGR opening to the inlet system of the internal combustion engine can therefore be more efficiently cooled.

One aspect of the present disclosure is an exhaust heat recovery device disposed in an exhaust path from an internal combustion engine. The exhaust heat recover device comprises an exhaust pipe, and a heat exchanger. The exhaust pipe carries exhaust downstream. The heat exchanger exchanges heat between the exhaust carried through the exhaust pipe and cooling fluid. The heat exchanger also comprises plates, an inner shell, and an outer shell. Each plate is circular in shape and includes a flow path for the cooling fluid inside. The plates externally surround the exhaust pipe and are arranged along an axis that extends linearly. The inner shell externally surrounds the exhaust pipe such that a heat exchange space that accommodates the arranged plates is formed between the inner shell and the exhaust pipe. The outer shell includes an EGR opening coupled to an EGR pipe. The EGR pipe is configured to recirculate the exhaust to an inlet system of the internal combustion engine. The outer shell externally covers at least a part of the inner shell to form an external space, leading to the EGR opening, between the outer shell and the inner shell.

A direction that points from the EGR opening to the exhaust pipe and is orthogonal to the axis is a reference direction. A plane that lies orthogonally to the reference direction and passes the center of the heat exchange space in the reference direction is a first reference plane. The inner shell comprises at least one aperture area that communicates the heat exchange space with the external space. The at least one aperture area is disposed at an intersection where the inner shell intersect with the first reference plane.

Similar to the aforementioned configuration, a first volume is a portion of the heat exchange space located between the first reference plane (in other words, the center of the heat exchange space in the reference direction) and the EGR opening; and a second volume is a remainder of the heat exchange space.

According to the aforementioned configuration, at least one aperture area is disposed at the intersection of the inner shell with the first reference plane. In other words, the at least one aperture area is situated on a boundary between the first volume and the second volume. The exhaust from the first volume and the exhaust from the second volume therefore flow through the same aperture area and discharged to the external space. Since the at least one aperture area is situated in a central area of the heat exchange space, the difference between a pressure loss generated when the exhaust in the first volume passes through the at least one aperture area and a pressure loss generated when the exhaust in the second volume passes through the at least one aperture area can be reduced.

This reduces the difference between the pressure loss generated until the exhaust reaches the EGR opening from the second volume and the pressure loss generated until the exhaust reaches the EGR opening from the first volume, which consequently reduces the bias in the exhaust flow in the heat exchange space. The exhaust recirculated from the EGR opening to the inlet system of the internal combustion engine can therefore be efficiently cooled.

In one aspect of the present disclosure, the inner shell may comprise aperture areas. At least one aperture area may be disposed at one intersection in the inner shell. At least one aperture area may be disposed at an other intersection in the inner shell. The other intersection faces the one intersection across the heat exchange space.

According to this configuration, the discharge of the exhaust from the heat exchange space to the external space is prompted while reducing the bias in the exhaust flow in the heat exchange space, which enables an efficient recirculation of the exhaust to the inlet system of the internal combustion engine.

In one aspect of the present disclosure, an average distance that the exhaust travels downstream in the external space from each aperture area to the EGR opening may be a travel distance. The travel distance of at least one aperture area at the one intersection and the travel distance of at least one aperture area at the other intersection may be the same or substantially the same.

This configuration can reduce a difference between a pressure loss generated until the exhaust that passed at least one aperture area at the one intersection in the inner shell reaches the EGR opening and a pressure loss generated until the exhaust that passed at least one aperture area at the other intersection in the inner shell reaches the EGR opening. Consequently, the bias in the exhaust flow in the heat exchange space is further reduced. The exhaust recirculated from the EGR opening to the inlet system of the internal combustion engine can therefore be more efficiently cooled.

In one aspect of the present disclosure, the outer shell may externally surrounds the inner shell and forms the external space between the outer shell and the inner shell. The external space may externally surround the inner shell.

This configuration can enlarge the external space and therefore reduce the pressure loss generated when the exhaust flows downstream through the external space towards the EGR opening. Accordingly, the exhaust can be efficiently recirculated to the inlet system of the internal combustion engine.

In one aspect of the present disclosure, any one plate of the plates may be a first plate, and any one plate of the plates other than the first plate may be a second plate. The at least one aperture area may be situated on the inner shell along the axis between a point where the inner shell faces the first plate and a point where the inner shell faces the second plate.

According to this configuration, the at least one aperture area is arranged along the axis from the first plate to the second plate. The bias in the exhaust flow can thus be reduced in surrounding areas of each plate that face the at least one aperture area. This can consequently reduce the bias in the efficiency of heat exchange in each plate. Accordingly, the exhaust can be efficiently cooled.

In one aspect of the present disclosure, the exhaust pipe and the inner shell may be cylindrical in shape and may extend along the axis. A shape of a cross section of the exhaust pipe and a shape of a cross section of the inner shell, the cross sections being orthogonal to the axis, may be circle or substantially circle. A center of the cross section of the exhaust pipe and a center of the cross section of the inner shell may be located on or near the axis.

This configuration enables a reduction of the bias in the exhaust flow in the external space and the heat exchange space. Accordingly, the exhaust recirculated from the EGR opening to the inlet system of the internal combustion engine can be efficiently cooled.

In one aspect of the present disclosure, the inner shell may comprise aperture areas. A plane that lies orthogonally to the first reference plane and includes the axis may be a second reference plane. The aperture areas may be arranged line-symmetric or substantially line-symmetric with reference to the second reference plane on a cross section of the inner shell, the cross section being orthogonal to the axis.

This configuration reduces the bias in the exhaust flow in the external space and the heat exchange space. Accordingly, the exhaust recirculated from the EGR opening to the inlet system of the internal combustion engine can be efficiently cooled.

In one aspect of the present disclosure, the exhaust heat recover device may be disposed in an exhaust path from the internal combustion engine of a vehicle.

According to this configuration, the exhaust recirculated to the inlet system of the internal combustion engine of the vehicle can be efficiently cooled.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

The present disclosure is not limited to the embodiments explained hereinafter and may be modified in various modes within the technical scope of the present disclosure.

Embodiment 1

[Overall Structure]

Figure 1:
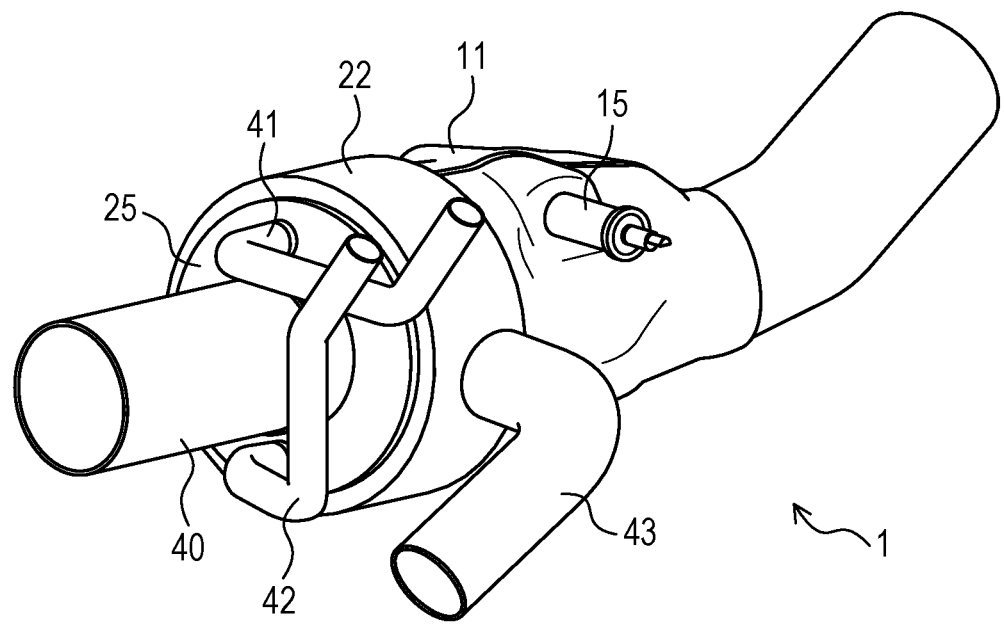
FIG. 1 is a perspective view of an exhaust heat recovery device in a first embodiment.

As shown in FIG. 1, 2, an exhaust heat recovery device 1 of the first embodiment is installed in a moving vehicle (for example, automobiles) having an internal combustion engine. The exhaust heat recovery device 1 is disposed in an exhaust path from the internal combustion engine. Hereinafter, upstream of the exhaust path is simply referred to as the upstream; downstream of the exhaust path is simply referred to as the downstream. The exhaust heat recovery device 1 comprises an exhaust heat recovery function and an EGR cooling function. The exhaust heat recovery function recovers heat from the exhaust discharged from the internal combustion engine.

The EGR cooling function cools the exhaust for recirculation in an EGR that recirculates a part of the exhaust to an inlet system of the internal combustion engine. The exhaust heat recovery device 1 is coupled to an EGR pipe 43 that carries the exhaust downstream towards the inlet system of the internal combustion engine. The EGR pipe 43 comprises an EGR valve, which is not shown in the drawings. The EGR valve is configured to open when the exhaust is recirculated to the inlet system of the internal combustion engine, and is configured to close when the exhaust is not recirculated. If the EGR valve is open, then the exhaust heat recovery device 1 functions as an EGR cooler to cool the exhaust and recirculate the cooled exhaust to the inlet system of the internal combustion engine.

Figure 2:
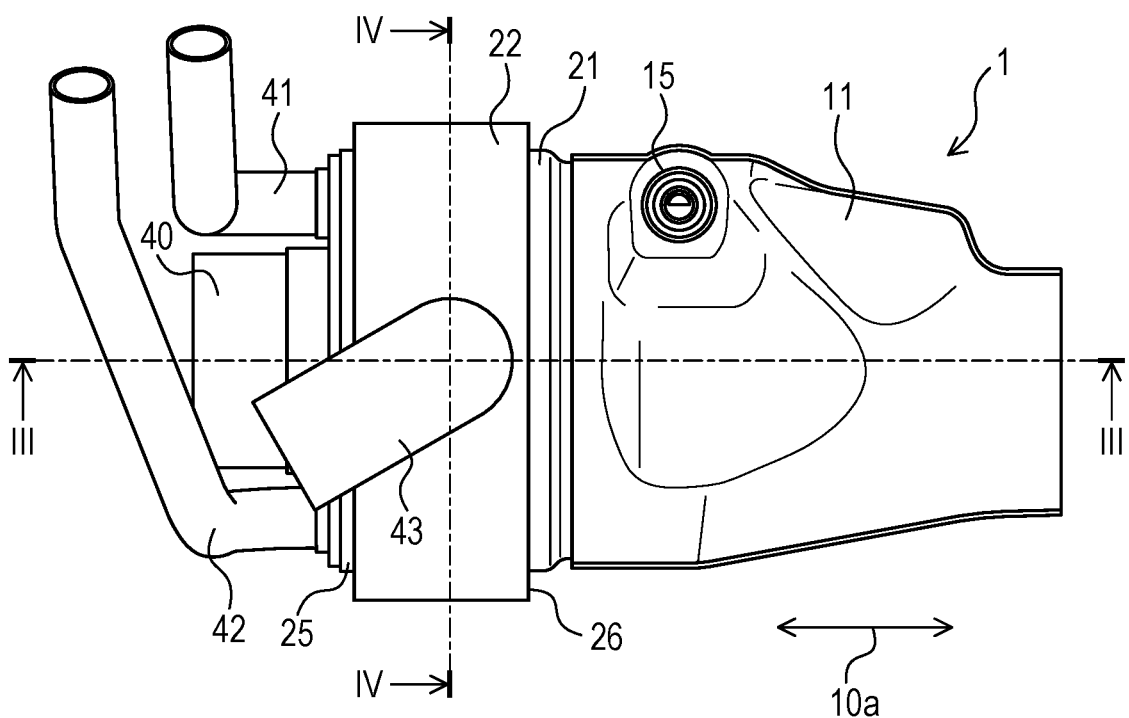
FIG. 2 is a side view of the exhaust heat recovery device in the first embodiment.
Figure 3:
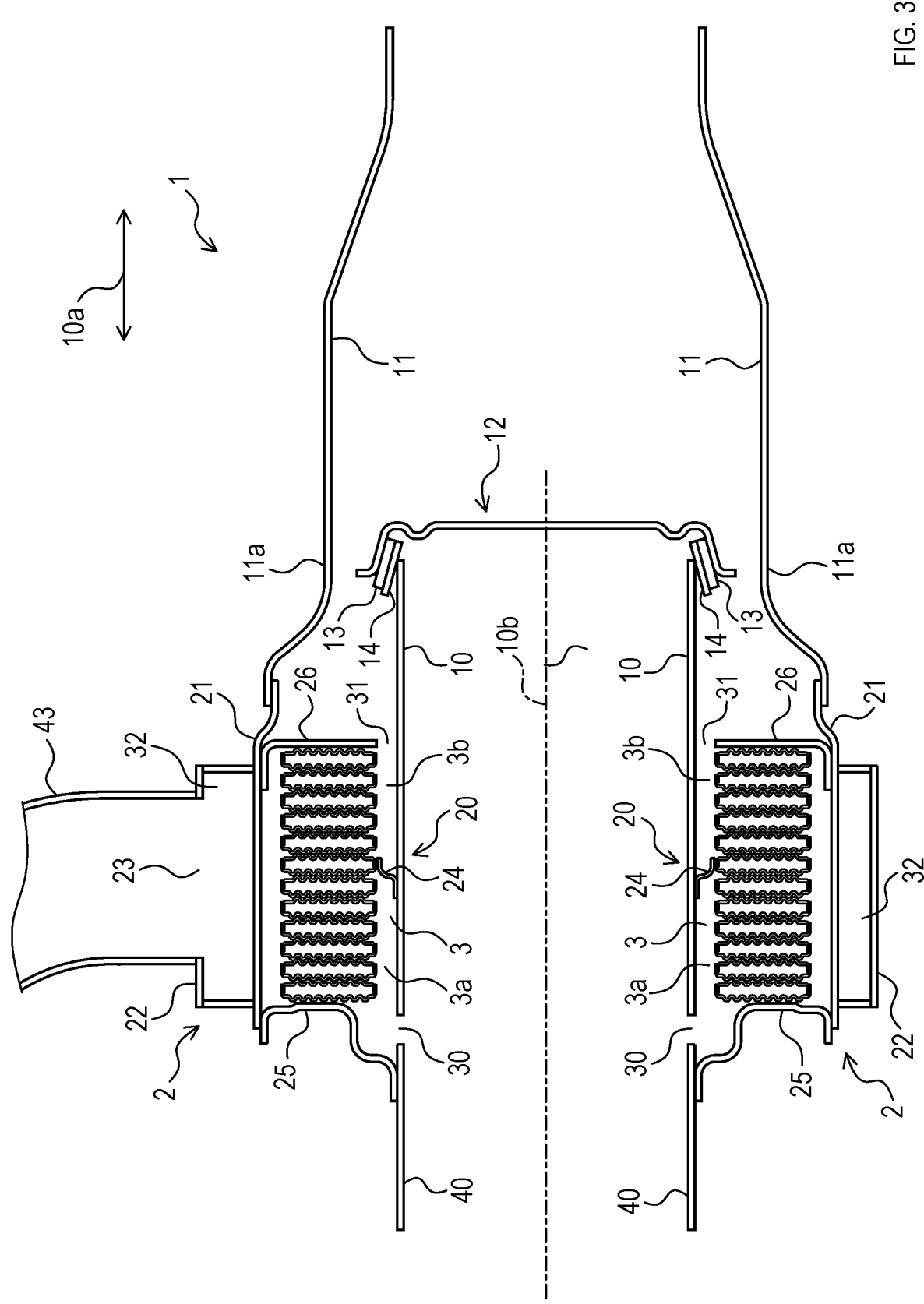
FIG. 3 is a sectional view of the exhaust heat recovery device in FIG. 2 taken along line III-III.

The exhaust heat recovery device 1 is coupled to the downstream of an upstream pipe 40 that carries the exhaust from the internal combustion engine downstream and is installed in the moving vehicle. As shown in FIG. 1 to 3, the exhaust heat recovery device 1 comprises a first exhaust pipe 10, a second exhaust pipe 11, an adjusting valve 12, and a heat exchanger 2.

The first exhaust pipe 10 carries the exhaust from the upstream pipe 40 downstream. A linear axis of the first exhaust pipe 10 is an axis 10b. Directions along the axis 10b are axial directions 10a. The first exhaust pipe 10 linearly extends in the axial directions 10a. In one example, the first exhaust pipe 10 is cylindrical in shape. The shape of a cross section of the first exhaust pipe 10, orthogonal to the axial directions 10a, is a circle or substantially a circle. Hereinafter, the cross section orthogonal to the axial directions 10a, is simply referred to as the cross section. A center of the cross section of the first exhaust pipe 10 is located on or near the axis 10b. The shape of the cross section of the first exhaust pipe 10 may be, for example, an ellipse or a polygon. The first exhaust pipe 10 may also be curved.

An upstream opening of the first exhaust pipe 10 faces a downstream opening of the upstream pipe 40. There is a gap between a rim surrounding the upstream opening of the first exhaust pipe 10 and a rim surrounding the downstream opening of the upstream pipe 40. The gap defines an entry 30 leading to a heat exchange space 3, which will be explained later.

The second exhaust pipe 11 is cylindrical in shape. The second exhaust pipe 11 is coupled to a downstream opening of the first exhaust pipe 10 and carries the exhaust from the first exhaust pipe 10 to the outside. The second exhaust pipe 11 has a diameter greater than a diameter of the first exhaust pipe 10. A downstream end of the first exhaust pipe 10 is situated in an inner side of an upstream end of the second exhaust pipe 11. The upstream end of the second exhaust pipe 11 includes an enlarged-diameter portion 11a with an enlarged diameter. A rim surrounding an upstream opening of the enlarged-diameter portion 11a (in other words, an upstream opening of the second exhaust pipe 11) is coupled to a rim surrounding a downstream opening of an inner shell 21 of the heat exchanger 2, which will be explained later. A flow path leading to an exit 31 of the heat exchanger 2 is formed between an inner side wall of the second exhaust pipe 11 and an outer side wall of the first exhaust pipe 10.

The adjusting valve 12 is configured to open and close the downstream opening of the first exhaust pipe 10. The adjusting valve 12 is configured to be pivotable about a rotating shaft 15. The rotating shaft 15 is situated near the downstream opening of the first exhaust pipe 10 and extends orthogonally to the axis 10b. Both ends of the rotating shaft 15 protrude outside of the second exhaust pipe 11. The adjusting valve 12 pivots about the rotating shaft 15 in response to an end of the rotating shaft 15 being rotationally driven. The adjusting valve 12 thus opens and closes the downstream opening of the first exhaust pipe 10.

A rim 14 is situated on the downstream end of the first exhaust pipe 10. The rim 14 surrounds the downstream opening of the first exhaust pipe 10. The rim 14 is circular in shape. On an outer circumferential surface of the rim 14 that faces outward, a buffer 13 is disposed. The buffer 13 is made of a material (wire mesh, for example) having heat-resisting property and buffering property. The adjusting valve 12 contacts the buffer 13 when the adjusting valve 12 closes the downstream opening of the first exhaust pipe 10.

By adjusting the extent of opening at the downstream opening of the first exhaust pipe 10 with the adjusting valve 12, the ratio of the amount of exhaust that flows out from the first exhaust pipe 10 to the second exhaust pipe 11 without passing the heat exchanger 2 to the amount of exhaust that flows into the heat exchanger 2 from the first exhaust pipe 11 can be changed.

[Configuration of Heat Exchanger]

The heat exchanger 2 in the exhaust heat recovery device 1 recovers exhaust heat and cools the exhaust by exchanging heat between the exhaust that flows from the first exhaust pipe 10 and cooling fluid (for example, cooling water, and oil). The recovered heat may be used, for example, as a heat source for warming the internal combustion engine or devices accompanying the internal combustion engine, or for a heater. As shown in FIG. 3, 4, the heat exchanger 2 is disposed to externally surround the outer side wall of the first exhaust pipe 10. The heat exchanger 2 is then supplied with the cooling fluid through an external supply pipe 41. The cooling fluid used in heat exchange in the heat exchange 2 is discharged from an external exhaust pipe 42.

The heat exchanger 2 is coupled to the EGR pipe 43, which is coupled to the inlet system of the internal combustion engine. The exhaust cooled in the heat exchanger 2 is recirculated to the inlet system of the internal combustion engine when the EGR valve in the EGR pipe 43 is open.

The heat exchanger 2 is a so-called shell-and-plate heat exchanger. The heat exchanger 2 comprises plates 20, the inner shell 21, an outer shell 22, a partition 24, an upstream wall 25, and a downstream wall 26.

The inner shell 21 externally surrounds the outer side wall of the first exhaust pipe 10 and forms the heat exchange space 3 between the inner shell 21 and the first exhaust pipe 10. The plates 20 are situated in the heat exchange space 3. In one example, the inner shell 21 is cylindrical in shape and extends in the axial directions 10a. The shape of a cross section of the inner shell 21 is a circle or substantially a circle. In one example, a center of the cross section of the inner shell 21 is located on or near the axis 10b. The shape of the cross section of the inner shell 21 may be, for example, an ellipse or a polygon.

The inner shell 21 comprises at least one aperture area 5 (details will be explained later) configured to communicate the heat exchange space 3 with an external space 32.

The upstream wall 25 separates the heat exchange space 3 from the outer space in an upstream of the inner shell 21. An outer rim of the upstream wall 25 is coupled to a rim of the inner shell 21 surrounding the upstream opening of the inner shell 21. An inner rim of the upstream wall 25 is coupled to an outer side wall of the downstream end of the upstream pipe 40. The upstream wall 25 comprises an opening leading to the external supply pipe 41 and an internal supply passage 20a, and another opening leading to the external exhaust pipe 42 and an internal exhaust passage 20b. Details of the internal supply passage 20a and the internal exhaust passage 20b will be mentioned later.

The downstream wall 26 separates the heat exchange space 3 from the outer space at the downstream of the inner shell 21. The downstream wall 26 is situated between the inner shell 21 and the first exhaust pipe 10 near the downstream opening of the inner shell 21. The downstream wall 26 abuts an inner side wall of the inner shell 21 and is arranged to leave a gap from the first exhaust pipe 10. The gap creates the exit 31 that leads to the heat exchange space 3.

The outer shell 22 externally surrounds the outer side wall of the inner shell 21 and forms the external space 32 between the outer shell 22 and the inner shell 21. In one example, the outer shell 22 is substantially cylindrical in shape and extends in the axial directions 10a. The shape of a cross section of the outer shell 22 is a circle or substantially a circle. In one example, a center of the cross section of the outer shell 22 is located on or near the axis 10b. The shape of the cross section of the outer shell 22 may be an ellipse or a polygon.

An upstream opening and a downstream opening of the outer shell 22 each comprise a wall at their rim. Both walls are coupled to the inner shell 21 and separate the external space 32 from the outer space.

The outer shell 22 also comprises an EGR opening 23 configured to be connected to the EGR pipe 43. In one example in the first embodiment, the EGR opening 23 is circular or substantially circular in shape, and a center of the EGR opening 23 is located at the center of the outer shell 22 in the axial directions 10a. The shape of the EGR opening 23 may be, for example, an ellipse or a polygon.

The plates 20 are configured for the heat exchange between the cooling fluid and the exhaust and are situated in the heat exchange space 3. As shown in FIG. 3, 4, the plates 20 are arranged along the axial directions 10a and externally surround the outer side wall of the first exhaust pipe 10. Each of the plates 20 has a gap between itself and the adjacent plate 20.

Each plate 20 is made of a material with a high thermal conduction property (for example, metals such as stainless-steel, aluminum alloy, and copper alloy). Each plate 20 is flat and circular in shape, includes a flow path for the cooling fluid formed inside, and extends in a direction orthogonal to the axial directions 10a.

More specifically, in a front view (sectional view), each plate 20 comprises an inner rim 20c situated in the inner circumference of the plate 20 and an outer rim 20d situated in the outer circumference of the plate 20. The inner rim 20c and the outer rim 20d are concentric with each other. Each plate 20 is arranged such that a center of the inner rim 20c and a center of the outer rim 20d are located on or near the axis 10b.

Each plate 20 is coupled to the internal supply passage 20a and the internal exhaust passage 20b. The internal supply passage 20a and the internal exhaust passage 20b linearly extend in the axial directions 10a and are tubular in shape. The internal supply passage 20a and the internal exhaust passage 20b face each other across the axis 10b. The internal supply passage 20a extends from the opening of the upstream wall 25 to the heat exchange space 3 and is coupled to the external supply pipe 41 via the opening of the upstream wall 25. The internal exhaust passage 20b extends from the opening of the upstream wall 25 to the heat exchange space 3 and is coupled to the external exhaust pipe 42 via the opening of the upstream wall 25.

A flow path in the plate 20 is arranged around the inside of the plate 20 and leads to the internal supply passage 20a and the internal exhaust passage 20b. The cooling fluid flows from the external supply pipe 41 to the internal supply passage 20a and then flows into the flow path of each plate 20. The cooling fluid then flows downstream of the flow path of each plate 20, enters the internal exhaust passage 20b, and flows to the external exhaust pipe 42.

The partition 24 separates the heat exchange space 3 into an upstream volume 3a in the upstream and a downstream volume 3b in the downstream. Among the plates 20, one plate 20 that is not arranged at an end of the plate arrangement of the plates 20 is referred to as a subject plate. In one example in the first embodiment, the subject plate is a plate 20 near the center of the arranged plates 20 in the axial directions 10a (the $6^{th}$ plate from the downstream, for example). The partition 24 closes a space between the inner rim 20c of the subject plate 20 and the outer side wall of the first exhaust pipe 10. Accordingly, the heat exchange space 3 is divided into the upstream volume 3a and the downstream volume 3b.

At least one plate 20 is arranged in each of the upstream volume 3a and the downstream volume 3b. In the upstream volume 3a, the exhaust entered from the entry 30 flows downstream from the inner circumference to the outer circumference towards the EGR opening 23 while contacting the plates 20. In the downstream volume 3b, the exhaust that does not enter the EGR opening 23 flows from the outer circumference to the inner circumference towards the exit 31 while contacting the plates 20, passes the exit 31, and enters the second exhaust pipe 11.

[Function of Exhaust Heat Recovery Device]

In the first embodiment, the exhaust heat recovery device 1 can adjust the amount of exhaust that flows from the first exhaust pipe 10 to the heat exchanger 2 by adjusting the extent of opening the adjusting valve 12 at the first exhaust pipe 10. The exhaust enters the heat exchange space 3 from the entry 30. The heat is then transferred between the exhaust that flows around each plate 20 to the downstream and the cooling fluid that flows downstream through the flow path inside of each plate 20. Accordingly, the heat is recovered and the exhaust is cooled.

The EGR valve is opened when recirculating the exhaust to the inlet system of the internal combustion engine. The extent of opening the adjusting valve 12 is adjusted so that an appropriate amount of the exhaust enters the heat exchanger 2. In this case, the heat exchanger 2 functions as the EGR cooler. This inhibits an increase of the temperature of intake air, and consequently, inhibits a decrease in efficiency in filling the intake air.

In a case that the exhaust is not recirculated to the inlet system of the internal combustion engine, the EGR valve is closed. In a case that the recovery of heat from the exhaust is not necessary, the adjusting valve 12 is opened. In this case, substantially all the exhaust that entered the first exhaust pipe 10 flows out to the second exhaust pipe 11.

There is a possibility, when recirculating the exhaust, that the amount of exhaust supplied to the heat exchange space 3 via the entry 30 is excessively less than the amount of exhaust that enters from the heat exchanger 2 to the EGR pipe 43. This may cause a backflow of a high-temperature exhaust from the second exhaust pipe 11 to the heat exchange space 3 via the exit 31.

In contrast, in the exhaust heat recovery device 1 in the first embodiment, the heat exchange space 3 in the heat exchanger 2 is divided into the upstream volume 3a and the downstream volume 3b by the partition 24. Therefore, when the high-temperature exhaust backflows from the second exhaust pipe 11 to the heat exchange space 3 via the exit 31, such backflowing exhaust first contacts the plates 20 in the downstream volume 3b separated by the partition 24 before reaching the EGR pipe 43. Accordingly, the backflowing exhaust can be cooled before being discharged to the EGR pipe 43, which can inhibit an increase of the temperature of intake air.

[Aperture Area]

Figure 4:
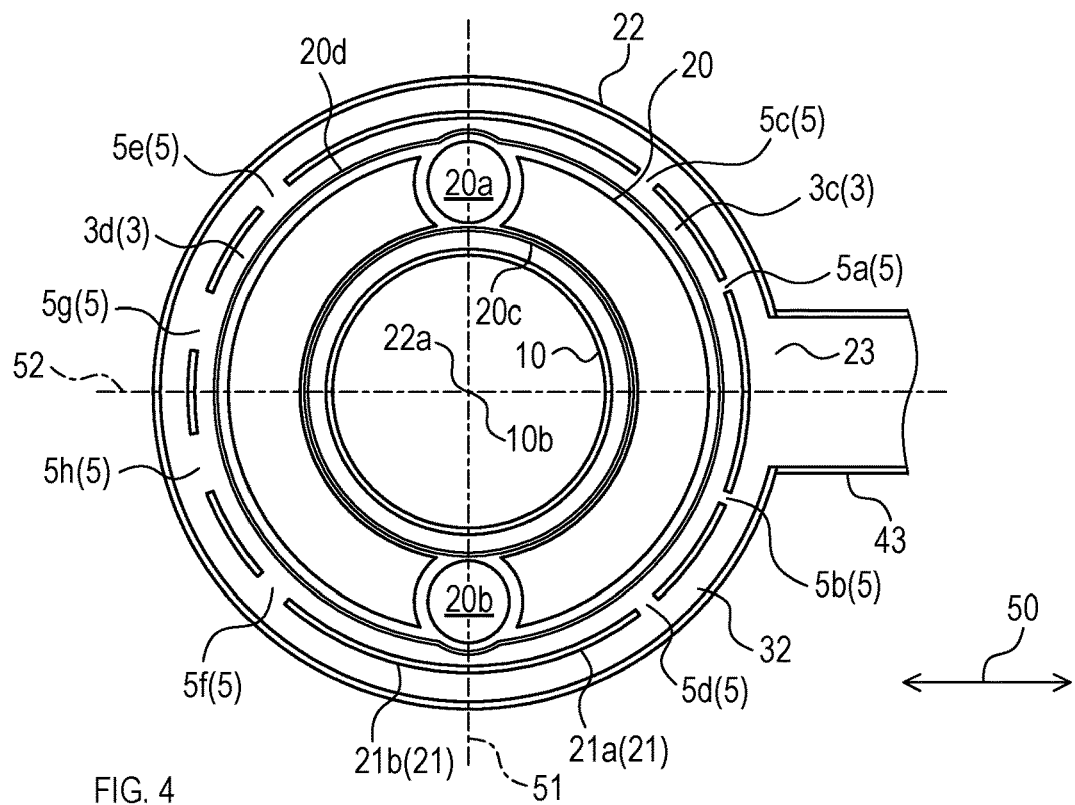
FIG. 4 is a sectional view of the exhaust heat recovery device in FIG. 2 taken along line IV-IV.

As shown in FIG. 4, the inner shell 21 of the heat exchanger 2 is cylindrical in shape and separates the heat exchange space 3 from the external space 32. The center of the cross section of the inner shell 21 is located on or near the axis 10b. The center of the inner rim 20c and the center of the outer rim 20d of each plate 20 are also located on or near the axis 10b. Therefore, in a cross section of the heat exchanger 2, the inner shell 21, the inner rim 20c, and the outer rim 20d of each plate 20 are concentric with each other.

Figure 5:
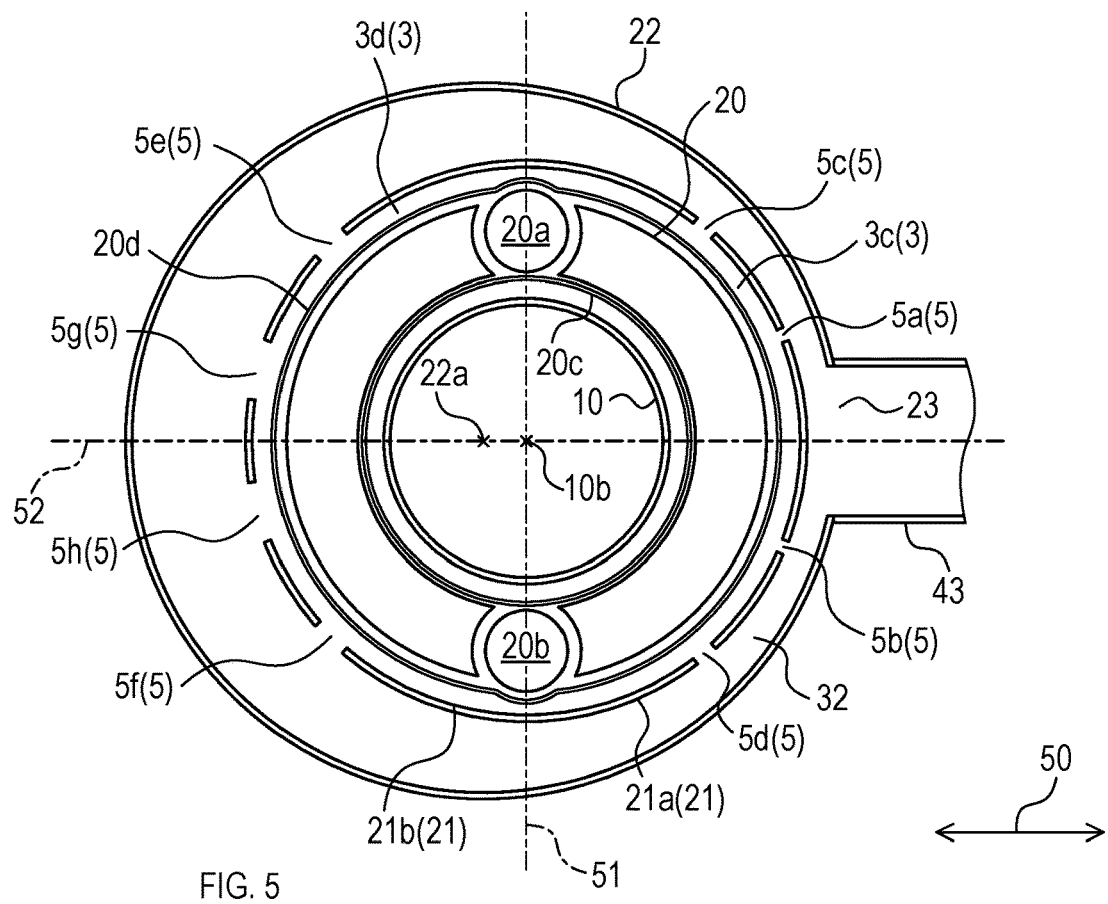
FIG. 5 is a sectional view of an exhaust heat recovery device in a modified example taken along line IV-IV of FIG. 2.
Figure 6:
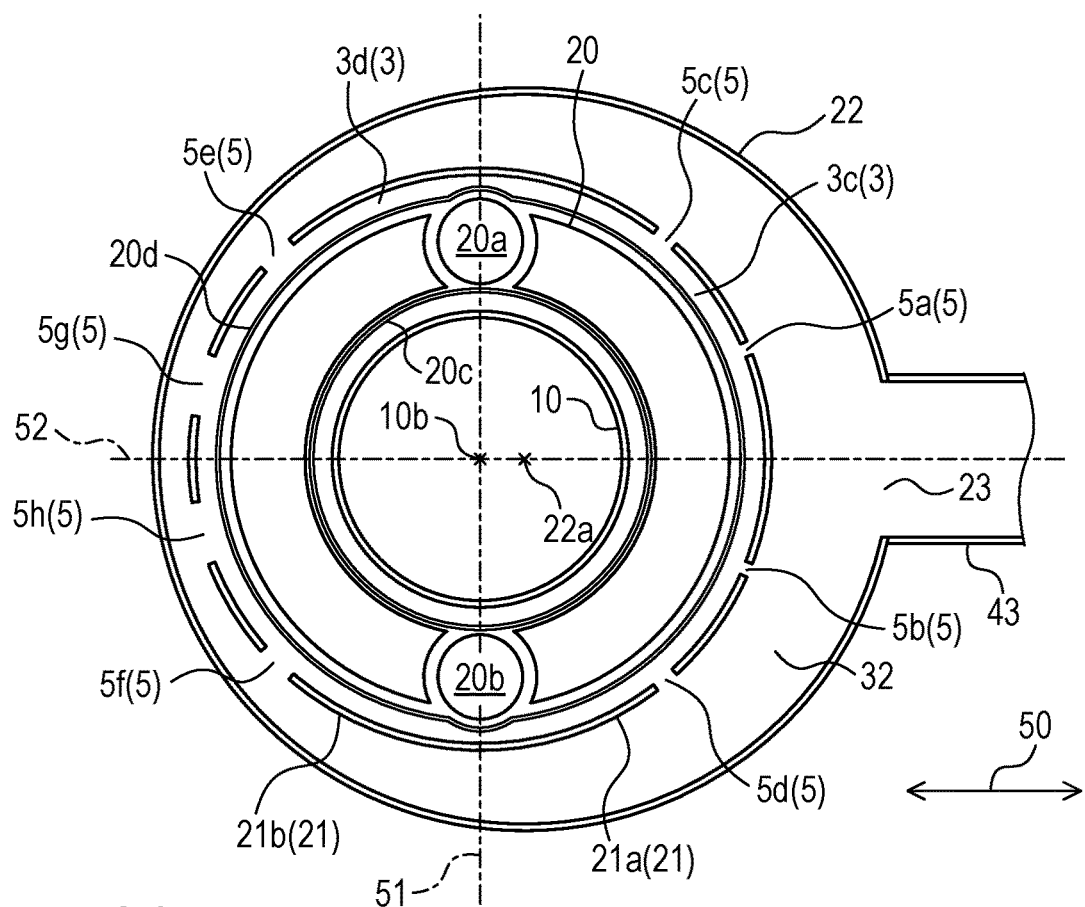
FIG. 6 is a sectional view of an exhaust heat recovery device in a modified example taken along line IV-IV of FIG. 2.

The outer shell 22 is substantially cylindrical in shape and externally covers the external space 32. The external space 32 is a flat space externally surrounding the outer side wall of the inner shell 21. The external space 32 has a uniform or substantially a uniform thickness. The shape of the cross section of the outer shell 22 is a circle or substantially a circle. The center 22a of the cross section of the outer shell 22 is located on or near the axis 10b. The center 22a of the cross section of the outer shell 22 may be located away from the axis 10b. A direction moving away from the EGR opening 23 is a distal side; a direction moving close to the EGR opening 23 is a proximal side. For example, the center 22a of the outer shell 22 may be moved to the distal side relative to the axis 10b as shown in FIG. 5, or may be moved to the proximal side relative to the axis 10b as shown in FIG. 6.

A direction orthogonal to the axial directions 10a and moving from the EGR opening 23 towards the first exhaust pipe 10 is a reference direction 50. In one example in the first embodiment, a direction orthogonal to the axial directions 10a and moving from the center of the EGR opening 23 towards the axis 10b is the reference direction 50. Nevertheless, the reference direction 50 may be determined with reference to other point in the EGR opening 23 or other point in the first exhaust pipe 10. A virtual plane orthogonal to the reference direction 50 and passing the center of the heat exchange space 3 in the reference direction 50 is a first reference plane 51. An area in the heat exchange space 3 situated close to the EGR opening 23 with respect to the first reference plane 51 is a first volume 3c; the other area in the heat exchange space 3 is a second volume 3d.

The inner shell 21 comprises at least one aperture area 5 that communicates the heat exchange space 3 with the external space 32. The aperture area 5 comprises at least one opening that communicates the heat exchange space 3 with the external space 32. A portion of the inner shell 21 that abuts the first volume 3c is a first portion 21a; a portion of the inner shell 21 that abuts the second volume 3d is a second portion 21b. The inner shell 21 comprises four aperture areas, namely A-aperture 5a to D-aperture 5d situated in the first portion 21a and four aperture areas, namely E-aperture 5e to H-aperture 5h situated in the second portion 21b.

The number of aperture areas situated in each of the first and second portions 21a, 21b may be less than 4 or 5 or more. The aperture areas may be situated across the first portion 21a and the second portion 21b. The inner shell 21 may comprise only one aperture area situated across the first portion 21a and the second portion 21b.

In the aperture areas 5, a total area of the openings communicating the second volume 3d with the external space 32 is greater than a total area of the openings communicating the first volume 3c with the external space 32.

Figure 7:
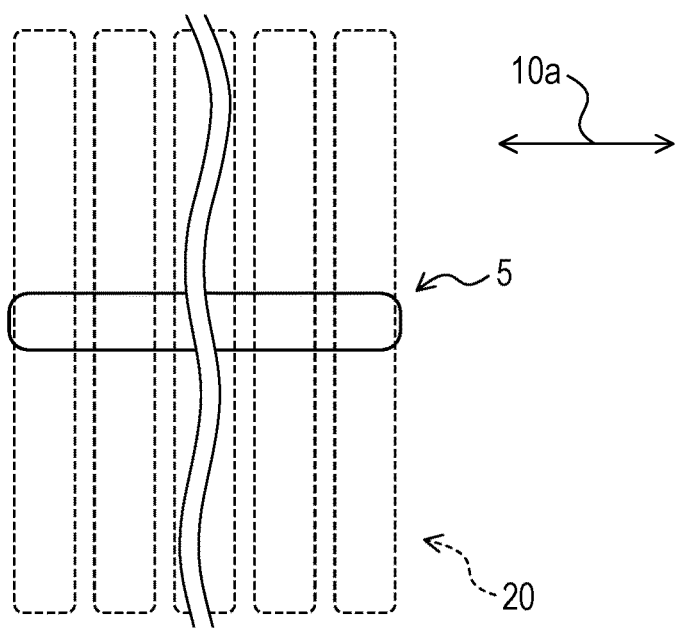
FIG. 7 is an explanatory diagram showing an aperture area.
Figure 8:
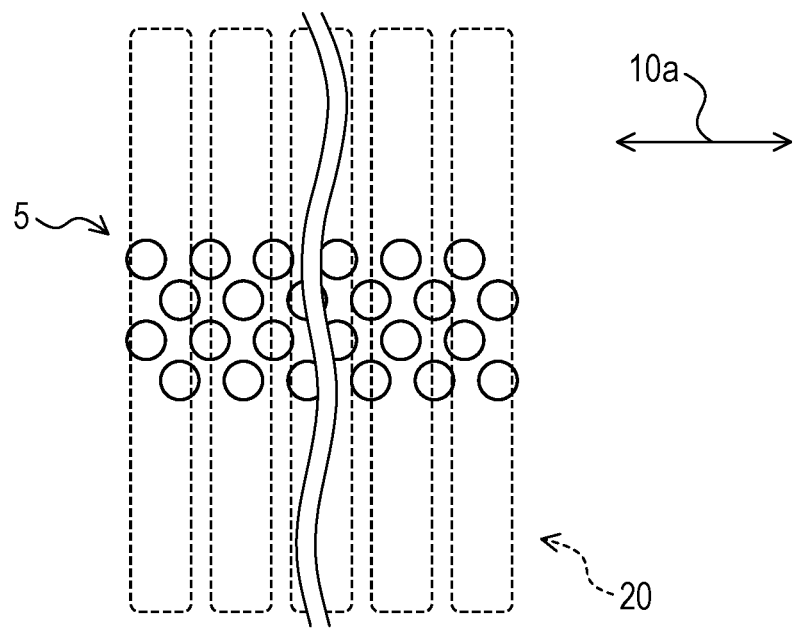
FIG. 8 is an explanatory diagram showing aperture areas.

Each aperture area 5 is arranged in the axial directions 10a. Specifically, as shown in FIG. 7, each aperture area 5 may comprise, for example, an elongated opening extending in the axial directions 10a. As shown in FIG. 8, each aperture area 5 may comprise, for example, circular openings arranged in the axial directions 10a. The arrangement of the aperture area 5 should not be limited to these examples. The aperture area 5 need not be arranged in the axial directions 10a.

One plate 20 of the plates 20 is a first plate; and any plate 20 of the plates 20 other than the first plate is a second plate. Each aperture area 5 is situated on the inner shell 21 at least from a point where the inner shell 21 faces the first plate to a point where the inner shell 21 faces the second plate. The first plate may be a plate situated in an upstream end of the plate arrangement. The second plate may be a plate situated in a downstream end of the plate arrangement.

An average distance (in other words, a standard distance) that the exhaust from the aperture area 5 travels downstream in the external space 32 until reaching the EGR opening 23 is a travel distance. In each aperture area 5, the area of the at least one opening that communicates the external space 32 with the heat exchange space 3 increases as the travel distance increases. More specifically, for example, if the at least one opening in each of the aperture areas 5 has the same area and shape, or substantially the same area and shape, as one another, the magnitude relation of the distance of the shortest path between each of the aperture areas 5 and the EGR opening 23 in the external space 32 may be considered as the magnitude relation of the travel distance of these aperture areas 5. For example, the aperture area 5 may have points, and an average value of the distance of the shortest path between each point and the EGR opening 23 in the external space 32 may be considered as the travel distance.

A virtual plane that is orthogonal to the first reference plane 51 and includes the axis 10$b$ is a second reference plane 52. The second reference plane 52 passes through the center of the EGR opening 23. The A-aperture area 5$a$ and B-aperture area 5$b$, the C-aperture area 5$c$ and D-aperture area 5$d$, the E-aperture area 5$e$ and F-aperture area 5$f$, the G-aperture area 5$g$ and H-aperture are 5$h$ are each a pair. In the first embodiment, the two aperture areas included in each pair appear line-symmetric or substantially line-symmetric with reference to the second reference plane 52 on a cross section of the inner shell 21. In other words, the two aperture areas have the same or substantially the same shape of opening. In addition, in these two aperture areas, the area of the at least one opening and the travel distance are the same.

In other words, the magnitude relationship of the travel distance between the A-aperture area 5$a$ to H-aperture area 5$h$ is as follows.

$$Da=Db<Dc=Dd<De=Df<Dg=Dh$$

Da to Dh respectively correspond to the travel distances of the A-aperture area 5$a$ to H-aperture area 5$h$.

The magnitude relationship of the total area of the opening between the A-aperture area 5$a$ to H-aperture area 5$h$ is as follows.

$$Sa=Sb<Sc=Sd<Se=Sf<Sg=Sh$$

Sa to Sh respectively correspond to the total areas of the opening at the A-aperture area 5$a$ to H-aperture area 5$h$.

[Effect]

(1) In the conventional technique, pressure loss generated in the heat exchanger when the exhaust flows downstream around the plates decreases in the first volume, which is near the opening to the recirculation path of EGR, compared with that in the second volume, which is far from the opening. Accordingly, the exhaust flow is biased inside the heat exchanger, which causes a decrease in the efficiency of heat exchange. It is therefore desirable to reduce the difference between the pressure loss generated when the exhaust flows from the first volume and the pressure loss generated when the exhaust flows from the second volume.

In contrast to the conventional technique, according to the first embodiment, the total area of portions communicating the second volume 3$d$ with the external space 32 (hereinafter, the second apertures) in the A-aperture area 5$a$ to H-aperture area 5$h$ is larger than the total area of portions communicating the first volume 3$c$ with the external space 32 (hereinafter, the first apertures) in the A-aperture area 5$a$ to H-aperture area 5$h$. This prompts the pressure loss generated when the exhaust passes through the second apertures to be less than the pressure loss generated when the exhaust passes through the first apertures. Accordingly, the difference between the pressure loss generated until the exhaust reaches the EGR opening 23 from the second volume 3$d$ and the pressure loss generated until the exhaust reaches the EGR opening 23 from the first volume 3$c$ is reduced.

Consequently, discharge of the exhaust from the second volume 3$d$ to the external space 32 is prompted, which leads to a reduction of the bias in the exhaust flow in the heat exchange space 3. This can help efficiently cool the exhaust that is recirculated from the EGR opening 23 to the inlet system of the internal combustion engine.

(2) According to the first embodiment, the area of the portion communicating the heat exchange space 3 with the external space 32 in each aperture area 5 increases as the travel distance increases. This prompts a reduction of the pressure loss generated when the exhaust passes through the aperture areas 5 as the travel distance of the aperture areas 5 increases. This consequently prompts discharge of the exhaust flow from the aperture areas 5 having the long travel distance to the external space 32. The bias in the exhaust flow in the heat exchange space 3 is further reduced. Accordingly, the exhaust recirculated from the EGR opening 23 to the inlet system of the internal combustion engine can be more efficiently cooled.

(3) In the first embodiment, the external space 32 externally surrounds the inner shell 21. This enlarges the external space 32 and thus reduces the pressure loss generated when the exhaust flows downstream through the external space 32 towards the EGR opening 23. Accordingly, the exhaust can be efficiently recirculated to the inlet system of the internal combustion engine.

(4) In the first embodiment, the A-aperture area 5$a$ to H-aperture area 5$h$ are arranged in the axial directions 10$a$ across the first plate and the second plate. The bias in the exhaust flow can be reduced in surrounding areas of each plate 20 that face the aperture areas 5, which consequently reduces the bias in the efficiency of heat exchange in the plates 20. Accordingly, the exhaust can be efficiently cooled.

Embodiment 2

Figure 9:
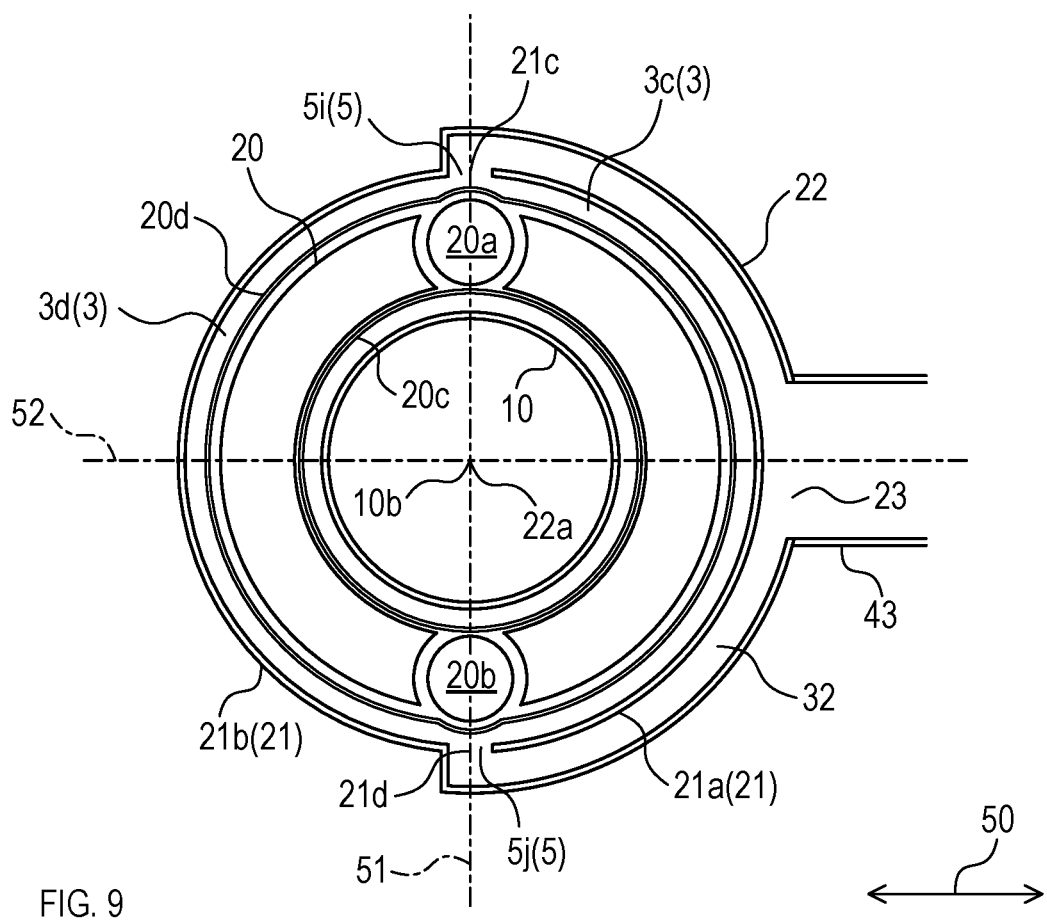
FIG. 9 is a sectional view of an exhaust heat recovery device in a second embodiment taken along line IV-IV of FIG. 2.

As shown in FIG. 9, the exhaust heat recovery device 1 in the second embodiment is different from that of the first embodiment in the configuration of the outer shell 22, the at least one aperture area 5, and the other elements in the heat exchanger 2. Hereinafter, this difference will be explained.

Portions of the inner shell 21 that intersect with the first reference plane 51 are intersections 21$c$, 21$d$. In other words, the intersections 21$c$, 21$d$ make a boundary between the first portion 21$a$ and the second portion 21$b$ in the inner shell 21. The two intersections 21$c$, 21$d$ of the inner shell 21 face each other across the heat exchange space 3. An I-aperture area 5$i$ and J-aperture area 5$j$ are situated respectively at the intersections 21$c$, 21$d$ of the inner shell 21. The aperture area 5 may be situated only at one of the intersections.

The outer shell 22 extends in the axial directions 10$a$ and is a groove like portion having a semi-circular or substantially a semi-circular cross-sectional shape. The outer shell 22 covers the first portion 21$a$ of the inner shell 21. The center of the cross section of the outer shell 22 is a center 22$a$, which is situated on or near the axis 10$b$. Similar to the first embodiment, the center 22$a$ of the outer shell 22 may be situated away from the axis 10*b*. The outer shell 22 exists from the location in front of the I-aperture area 5*i* to the location in front of the J-aperture area 5*j*. The external space 32 that communicates with the heat exchange space 3 via the I-aperture area 5*i* and J-aperture area 5*j* is formed between the outer shell 22 and the inner shell 21. The external space 32 is a flat space and has a uniform or substantially a uniform thickness.

Rims at both ends of the outer shell 22 in the axial directions 10*a* each have a wall. These walls are coupled to the inner shell 21 and separate the external space 32 from the outer space. In addition, rims of the outer shell 22 that face the aperture areas 5 also each have a wall. These walls are coupled to the inner shell 21 and separate the external space 32 from the outer space.

Similar to the first embodiment, the outer shell 22 comprises the EGR opening 23.

Also similar to the first embodiment, each of the I-aperture area 5*i* and J-aperture area 5*j* is situated on the inner shell 21 in the axial direction 10*a* at least from a point where the inner shell 21 faces the first plate to a point where the inner shell 21 faces the second plate.

The I-aperture area 5*i* and J-aperture area 5*j* are arranged to appear line-symmetric or substantially line-symmetric with reference to the second reference plane 52 on a cross section of the inner shell 21. In other words, the I-aperture area 5*i* and J-aperture area 5*j* have the same or substantially the same shape of the at least one opening and the same or substantially the same total area of the at least one opening. The I-aperture area 5*i* and J-aperture area 5*j* also have the same or substantially the same travel distance.

[Effect]

(1) In the second embodiment, the I-aperture area 5*i* and J-aperture area 5*j* are respectively situated at the first and the second intersections 21*c*, 21*d*, where the inner shell 21 intersects with the first reference plane 51. In other words, the I-aperture area 5*i* and J-aperture area 5*j* are situated on the boundary between the first volume 3*c* and the second volume 3*d*. The exhaust in first volume 3*c* and the exhaust in the second volume 3*d* flow through the same aperture area 5 and discharged to the external space 32. Since the aperture area 5 is situated in the central area of the heat exchange space 3, the difference between the pressure loss generated when the exhaust in the first volume 3*c* passes through the aperture area 5 and the pressure loss generated when the exhaust in the second volume 3*d* passes through the same aperture area 5 can be reduced.

Accordingly, the difference between the pressure loss generated until the exhaust reaches the EGR opening 23 from the second volume 3*d* and the pressure loss generated until the exhaust reaches the EGR opening 23 from the first volume 3*c* is reduced. This consequently reduces the bias in the exhaust flow in the heat exchange space 3. The exhaust recirculated from the EGR opening 23 to the inlet system of the internal combustion engine can therefore be efficiently cooled.

(2) In the second embodiment, the travel distances in the I-aperture area 5*i* and J-aperture area 5*j* are the same or substantially the same. This reduces the difference between the pressure loss generated until the exhaust that passed through the I-aperture area 5*i* reaches the EGR opening 23 and the pressure loss generated until the exhaust that passed through the J-aperture area 5*j* reaches the EGR opening 23. The bias in the exhaust flow in the heat exchange space 3 is therefore further reduced. Accordingly, the exhaust recirculated from the EGR opening 23 to the inlet system of the internal combustion engine can be more efficiently cooled.

Other Embodiment (1) In the first embodiment, the outer shell 22 externally surrounds the inner shell 21 to entirely cover the inner shell 21. However, the outer shell 22 may externally cover a part of the inner shell 21 while covering both the first and the second portions 21*a*, 21*b*. This configuration also leads to the same effect if at least one aperture area 5 is arranged similarly to the first embodiment.

(2) In the second embodiment, the outer shell 22 covers the first portion 21*a* of the inner shell 21 and the I-aperture area 5*i* and J-aperture area 5*j*. Nevertheless, the outer shell 22 may also cover the second portion 21*b*. More specifically, the outer shell 22 may externally surround the inner shell 21 similarly to the first embodiment. This configuration also leads to the same effect.

(3) Two or more functions achieved by one element in the aforementioned embodiments may be achieved by two or more elements; one function achieved by one element in the aforementioned embodiments may be achieved by two or more elements. Two or more functions achieved by two or more elements may be achieved by one element in the aforementioned embodiments; one function achieved by two or more elements may be achieved by one element in the aforementioned embodiments. A part of the configuration of the aforementioned embodiments may be omitted. At least a part of the configuration of the aforementioned embodiments may be added to or replaced with another configuration of the aforementioned embodiments.

What is claimed is:

1. An exhaust heat recovery device disposed in an exhaust path from an internal combustion engine, the device comprising:

an exhaust pipe configured to carry exhaust downstream; and a heat exchanger configured to exchange heat between the exhaust, carried through the exhaust pipe, and cooling fluid, wherein the heat exchanger comprises, plates;

an inner shell; and an outer shell, wherein each plate is circular in shape, wherein each plate includes a flow path for the cooling fluid inside, wherein the plates externally surround the exhaust pipe and the plates are arranged along an axis that extends linearly, wherein the inner shell externally surrounds the exhaust pipe such that a heat exchange space that accommodates the arranged plates is formed between the inner shell and the exhaust pipe, wherein the outer shell includes an EGR opening coupled to an EGR pipe, wherein the EGR pipe is configured to recirculate the exhaust to an inlet system of the internal combustion engine, and wherein the outer shell externally covers at least a part of the inner shell to form an external space, leading to the EGR opening, between the outer shell and the inner shell, wherein a direction that points from the EGR opening to the exhaust pipe and is orthogonal to the axis is a reference direction, wherein a plane that lies orthogonally to the reference direction and passes the center of the heat exchange space in the reference direction is a first reference plane, wherein the heat exchange space comprises a first volume and a second volume, wherein the first volume is a portion of the heat exchange space located between the first reference plane and the EGR opening, and the second volume is a remainder of the heat exchange space, wherein the inner shell comprises at least one aperture area communicating the heat exchange space with the external space, and wherein, in the at least one aperture area, an area of a portion communicating the second volume with the external space is larger than an area of a portion communicating the first volume with the external space.

2. The exhaust heat recovery device according to claim 1,
wherein the inner shell comprises aperture areas,
wherein an average distance that the exhaust travels downstream in the external space from each aperture area to the EGR opening is a travel distance, and
wherein an area of a portion communicating the heat exchange space with the external space in each aperture area increases as the travel distance increases.

3. The exhaust heat recovery device according to claim 1,
wherein the outer shell externally surrounds the inner shell and forms the external space between the outer shell and the inner shell, and
wherein the external space externally surrounds the inner shell.

4. The exhaust heat recovery device according to claim 1,
wherein any one plate of the plates is a first plate,
wherein any one plate of the plates other than the first plate is a second plate, and
wherein the at least one aperture area is situated on the inner shell along the axis between a point where the inner shell faces the first plate and a point where the inner shell faces the second plate.

5. The exhaust heat recovery device according to claim 1,
wherein the exhaust pipe and the inner shell are cylindrical in shape and extend along the axis,
wherein a shape of a cross section of the exhaust pipe and a shape of a cross section of the inner shell, the cross sections being orthogonal to the axis, are circle or substantially circle, and
wherein a center of the cross section of the exhaust pipe and a center of the cross section of the inner shell are located on or near the axis.

6. The exhaust heat recovery device according to claim 5,
wherein the inner shell comprises aperture areas,
wherein a plane that lies orthogonally to the first reference plane and includes the axis is a second reference plane, and
wherein the aperture areas are arranged line-symmetric or substantially line-symmetric with reference to the second reference plane on a cross section of the inner shell, the cross section being orthogonal to the axis.

7. The exhaust heat recovery device according to claim 1,
wherein the device is disposed in an exhaust path from the internal combustion engine of a vehicle.

8. An exhaust heat recovery device disposed in an exhaust path from an internal combustion engine, the device comprising:
an exhaust pipe configured to carry exhaust downstream; and
a heat exchanger configured to exchange heat between the exhaust, carried through the exhaust pipe, and cooling fluid,
wherein the heat exchanger comprises,
plates;
an inner shell; and
an outer shell,
wherein each plate is circular in shape,
wherein each plate includes a flow path for the cooling fluid inside,
wherein the plates externally surround the exhaust pipe and the plates are arranged along an axis that extends linearly,
wherein the inner shell externally surrounds the exhaust pipe such that a heat exchange space that accommodates the arranged plates is formed between the inner shell and the exhaust pipe,
wherein the outer shell includes an EGR opening coupled to an EGR pipe,
wherein the EGR pipe is configured to recirculate the exhaust to an inlet system of the internal combustion engine, and
wherein the outer shell externally covers at least a part of the inner shell to form an external space, leading to the EGR opening, between the outer shell and the inner shell,
wherein a direction that points from the EGR opening to the exhaust pipe and is orthogonal to the axis a reference direction,
wherein a plane that lies orthogonally to the reference direction and passes a center of the heat exchange space in the reference direction is a first reference plane,
wherein the inner shell comprises at least one aperture area that communicates the heat exchange space with the external space,
wherein the at least one aperture area is disposed at an intersection, and
wherein the intersection is a portion of the inner shell that intersects with the first reference plane.

9. The exhaust heat recovery device according to claim 8,
wherein the inner shell comprises aperture areas,
wherein at least one of the aperture areas is disposed at one intersection in the inner shell,
wherein at least one of the aperture areas is disposed at an other intersection that faces the one intersection across the heat exchange space.

10. An exhaust heat recovery device according to claim 9,
wherein an average distance that the exhaust travels downstream in the external space from each aperture area to the EGR opening is a travel distance, and
wherein the travel distance of at least one of the aperture areas disposed at the one intersection and the travel distance of at least one of the aperture areas disposed at the other intersection are the same or substantially the same.

11. The exhaust heat recovery device according to claim 8,
wherein the outer shell externally surrounds the inner shell and forms the external space between the outer shell and the inner shell, and
wherein the external space externally surrounds the inner shell.

12. The exhaust heat recovery device according to claim 8,
wherein any one plate of the plates is a first plate,
wherein any one plate of the plates other than the first plate is a second plate, and wherein the at least one aperture area is situated on the inner shell along the axis between a point where the inner shell faces the first plate and a point where the inner shell faces the second plate.

13. The exhaust heat recovery device according to claim 8,
wherein the exhaust pipe and the inner shell are cylindrical in shape and extend along the axis,
wherein a shape of a cross section of the exhaust pipe and a shape of a cross section of the inner shell, the cross sections being orthogonal to the axis, are circle or substantially circle, and
wherein a center of the cross section of the exhaust pipe and a center of the cross section of the inner shell are located on or near the axis.

14. The exhaust heat recovery device according to claim 13,
wherein the inner shell comprises aperture areas,
wherein a plane that lies orthogonally to the first reference plane and includes the axis is a second reference plane, and
wherein the aperture areas are arranged line-symmetric or substantially line-symmetric with reference to the second reference plane on a cross section of the inner shell, the cross section being orthogonal to the axis.

15. The exhaust heat recovery device according to claim 8,
wherein the device is disposed in an exhaust path from the internal combustion engine of a vehicle.

* * * * *